United States Patent [19]

Pastre

[11] 3,873,695

[45] Mar. 25, 1975

[54] REHYDRATING ANTI-DIARRHOEA COMPOSITION

[75] Inventor: Maurice Lionel Pastre, Lyon, France

[73] Assignee: PEPRO, Societe pour le Developpement et la Vente de Specialites Chimiques, Lyon, France

[22] Filed: July 11, 1973

[21] Appl. No.: 378,057

[30] Foreign Application Priority Data

July 27, 1972 France .............................. 72.27767

[52] U.S. Cl. ................ 424/131, 424/228, 424/232, 424/258, 424/317, 424/319
[51] Int. Cl. ........................................... A61k 27/00
[58] Field of Search .......... 424/131, 258, 232, 317, 424/228, 319

[56] References Cited
OTHER PUBLICATIONS

Beaufour et al, Chem. Abst., Vol. 61, (1964), page 646b.

Squibb, Chem. Abst., Vol. 69 (1968), page 109,810q.
Kupletskaya et al., Chem. Abst., Vol. 57, (1962), page 13008e.
Miller et al, Encyclopedia of Animal Care, — 6th Edit. — (1962), page 244.
Merck Veterinary Manual, 3rd Edit., (1967), pages 170, 171, 172, 173 and 174.
Veterinary Drug Encyclopedia, — 12th Edit., (1964), page 179.

*Primary Examiner*—Sam Rosen
*Attorney, Agent, or Firm*—Browdy and Neimark

[57] ABSTRACT

1. A composition for veterinary use.
2. It contains one or more disinfectants selected from the derivatives of 8-hydroxy quinoline, one or more astringents for intestinal dressing selected from the organic salts of bismuth or aluminum and one or more rehydrating agents selected from the magnesium, sodium, potassium or calcium salts of organic acids.
3. It can be used for controlling diarrhoea in young animals, especially calves, pigs and lambs.

9 Claims, No Drawings

REHYDRATING ANTI-DIARRHOEA COMPOSITION

This invention relates to veterinary compositions suitable for use in controlling diarrhoea in young animals, especially calves, pigs and piglets and lambs.

More particularly, the invention relates to compositions containing as active material a combination of one or more 8-hydroxy quinoline derivatives, one or more organic bismuth or aluminum salts, and one or more magnesium, sodium, potassium or calcium salts of organic acids.

Diarrhoea, which can be defined as the frequent faecal passage of water and electrolytes, is one of the primary causes of mortality in young calves, and is responsible for heavy losses on cattle farms.

In young animals affected by diarrhoea, the spontaneous consumption of milk is reduced by about 30 percent. This phenomenon, coupled with the diarrhoea itself, contributes towards explaining another two manifestations: the diarrhoeic calves undergo a loss of weight of as much as several hundred grams per day, and a reduction in diuresis of around 45 percent. Since the secretion or urine is reduced by 45 percent, certain wastes are no longer secreted, in addition to which there is a high incidence of uraemia. Irrespective of the causes of diarrhoea, malnutrition of the mother during gestation, malnutrition of the calf or pathogenic infection of the animal during fattening, the results are serious consequences in regard to the profitability of the cattle farm.

A young diarrhoeic animal is in a state of non-compensated metabollic acidosis. Extracellular dehydration sets in whilst cellular hyperhydration is intensified. The cellular exchanges are blocked, resulting in serious tissual anoxia.

Unfortunately, the various compositions which have hitherto been proposed for controlling diarrhoea are only partly satisfactory. These compositions are occasionally based on antibiotics, require a relatively long contact time and, in addition, are only specifically effective on certain forms of diarrhoea of infectious origin and are not active in regenerating the intestinal membrane.

Other compositions which are not based on antibiotics have only a partial effect and, in many cases, take too long to develop this effect to arrest development of the disorder and, hence, to prevent death of the animal.

It has now been found that remarkable results are obtained by combining the following three constituents in a synergic anti-diarrhoeic composition: at least one disinfectant preferably selected from the derivatives of 8-hydroxy quinoline, at least one astringent applying as it were an intestinal dressing, preferably selected from the organic salts of bismuth or aluminum, and at least one rehydrating agent preferably selected from the organic salts of magnesium, sodium, potassium or calcium.

The disinfectant, preferably selected from the derivatives of 8-hydroxy quinoline, disinfects the sore and, at the same time, regenerates the intestinal cells deteriorated by the diarrhoea.

The following compounds are mentioned as examples of suitable 8-hydroxy quinoline derivatives: 8-hydroxy quinoline, the double sulphate of 8-hydroxy quinoline and potassium, the sulphate of hydroxy quinoline and potassium, 5-chloro-8-hydroxy quinoline, 5,7-dibromo-8-hydroxy quinoline, 5,7-diiodo-8-hydroxy quinoline, 5-chloro-7-iodo-8-hydroxy quinoline, 5-nitro-8-hydroxy quinoline, 7-iodo-8-hydroxy quinoline-5-sulphonic acid and its alkali salts, N-methyl-8-hydroxy quinolinium methylsulphate, 8-hydroxy quinoline iodo bismuthate, bismuth or aluminum 8-hydroxy quinoleate, 8-hydroxy quinoline benzoate, 8-hydroxy quinoline sulphathiazole phthalate, 8-hydroxy quinoline salicylate, 8-hydroxy quinoline-5-sulphonic acid, 8-hydroxy quinoline hydrochloride, phosphorus derivatives of 8-hydroxy quinoline.

Although all the compounds mentioned above can be used in practice it is preferred to use those containing bismuth by virtue of the beneficial effect which bismuth has upon intestinal mucus.

The composition according to the invention also contains an astringent for intestinal dressing. The function of this component is to reduce the rate of the peristaltic movements of the intestine and, hence, to enable the rate at which the alimentary bolus passes through the intestine to be slowed down and to assist the digestive function in performing progressively in the normal manner.

The compounds suitable for use as astringents are selected from the compounds known as astringents in the prior art and, in particular, from the organic salts of bismuth or aluminum, for example the basic salicylates of these metals.

Finally, the composition according to the invention contains a rehydrating agent which, through the electrolytes present in it, acts on the cellular exchanges and re-establishes the hydromineral metabolism, enabling first the tissues and then the organism to be rehydrated.

This rehydrating agent is selected from the magnesium, sodium, potassium and calcium salts of organic acids, more particularly lactic acid, citric acid, fumaric acid, glutamic acid, propionic acid, aspartic acid, and methionine.

The respective percentages of each of the three types of active material in the composition can vary within certain limits in dependence upon the active materials used and, hence, upon their activity threshold.

A certain equilibrium is generally maintained between the three constituents, each of them being used in a quantity of from 50 to 200 parts per 1000 parts of the composition ready for use. All of the proportions used in the present specification and claims are parts by weight.

The following composition (A) which was used for the various tests reported below, is mentioned by way of example:

| | |
|---|---|
| - bismuth 8-hydroxy quinoleate | 80 |
| - sodium 7-iodo-8-hydroxy quinoline sulphonate | 70 |
| - basic aluminum salicylate | 100 |
| - magnesium fumarate | 33 |
| - sodium glutamate | 80 |
| - excipients and aromatics | q.s.f. 1000 |

TEST 1

A first series of tests was carried out on 387 three-month-old pigs weighing 28 to 33 kg which had contracted diarrhoea 15 days after they had been brought to a pig farm.

A first treatment was carried out unsuccessfully with antibiotics. One third of the animals did not take any more food.

A treatment with drinking water containing 10 g/pig of composition (A) was applied at the end of the afternoon. The next morning, i.e. 12 hours after ingestion of the product, all the pigs had regained their appetite and were eating normally.

Only 17 pigs were still affected by diarrhoea and were individually treated by injector gun. The dose administered to these animals was again 10 g/animal. 3 days afterwards, all the 387 pigs were in excellent health.

TEST 2

This test was carried out on 24 three and a half month old pigs weighing from 38 to 40 kg.

After they had been brought for fattening onto a pig farm, these pigs contracted diarrhoea in acclimatizing themselves to the pig farm. This diarrhoea was converted into infectious, haemorrhagic diarrhoea which caused the animals to stop eating but to drink excessively.

A dose of 10 g of composition (A) was administered to each animal, and a dose of 15 g to the animals accommodated in the two sties where the animals were most seriously affected.

By the evening, i.e. 13 to 14 hours after ingestion of the composition, the animals had regained their appetite. By the following day, the 24 pigs were in excellent health.

TEST 3

This test was carried out on 30 meat calves from 4 days to 5 weeks old. These animals were suffering from acute diarrhoea and were in a state of, in some cases, highly advanced dehydration, the most seriously ill calves showing signs of toxicosis.

Depending upon the age of the animals, a dose of 10 to 15 g of composition (A) was administered to each animal in drinking water.

After 24 hours, the diarrhoea had been arrested in the 30 calves.

The following are examples of other types of composition according to the invention which can be used for the above purpose:

Composition B
- aluminum 8-hydroxy quinoleate                60
- copper hydroxy quinoleate                   40
- bismuth subnitrate                          80
- basic aluminum salicylate                  100
- magnesium citrate                           50
- potassium citrate                           25
- calcium lactate                             50
- sodium glutamate                            30
- excipients and aromatics              q.s.f.1000

TEST 4

This test was carried out on 123 three month old pigs weighing from 26 to 32 kg.

After having been brought onto a pig farm and having been given feeds supplemented with antibiotics, the pigs contracted nauseous diarrhoea with a haemorrhagic tendency. A first treatment with sodium stovarsol was unable to arrest the enteritis which set in after 48 hours.

The test was carried out with a single dry dose of 10 g/pig of composition B which the pigs ingested without difficulty.

By the next morning, all the pigs had been restored to normal health and were eating normally.

Composition C
- bismuth hydroxy quinoleate                   80
- hydroxy quinoline sulphathiazole phthalate   60
- basic aluminium salicylate                   80
- sodium glutamate                             20
- magnesium glutamate                          50
- magnesium fumarate                           30
- potassium fumarate                           20
- excipients and aromatics              q.s.f.1000

TEST 5

This test was carried out on a batch of 5 three week old calves which had contracted diarrhoea and two of which were no longer able to stand.

A single dose of 20 g of composition C was administered to each calf. Those calves which refused to take the dose were treated forcibly with an injector gun.

The calves treated were restored to health within 48 hours, their dejecta being nauseous.

For their practical application, the compositions according to the invention can be brought into any suitable form for administration to the animals by conventional methods.

One particularly advantageous embodiment is the soluble formulation which can be administered to the animals in drinking water.

I claim:

1. A veterinary composition for controlling diarrhoea in young animals, comprising in unit dosage form a quantity sufficient to control diarrhoea of a combination of (1) at least one disinfectant selected from the derivatives of 8-hydroxy quinoline, (2) at least one astringent for intestinal dressing selected from the organic salts of bismuth or aluminum and (3) at least one rehydrating agent effective in acting on the cellular exchanges to re-establish the hydromineral metabolism, said rehydrating agents being selected from the magnesium, sodium, potassium or calcium salts of aspartic, fumaric or glutamic acids.

2. A composition as claimed in claim 1, wherein the astringent is a basic aluminum salicylate.

3. A composition in accordance with claim 1 wherein said disinfectants are metal salts of said 8-hydroxy quinoline derivatives.

4. A composition in accordance with claim 1 comprising:

- bismuth 8-hydroxy quinoleate        about 80 parts by wt.
- sodium 7-iodo-8-hydroxy quino-
  line-5-sulphonate                   about 70 parts by wt.
- basic aluminum salicylate           about 100 parts by wt.
- magnesium fumarate                  about 33 parts by wt.
- sodium glutamate                    about 80 parts by wt.

5. A composition in accordance with claim 1 comprising:

- aluminum 8-hydroxy quinoleate       about 60 parts by wt.
- copper hydroxy quinoleate           about 40 parts by wt.
- bismuth subnitrate                  about 80 parts by wt.
- basic aluminum salicylate           about 100 parts by wt.
- magnesium citrate                   about 50 parts by wt.
- potassium citrate                   about 25 parts by wt.
- calcium lactate                     about 50 parts by wt.
- sodium glutamate                    about 30 parts by wt.

6. A composition in accordance with claim 1 comprising:

| | |
|---|---|
| - bismuth hydroxy quinoleate | about 80 parts by wt. |
| - hydroxy quinoline sulphathiazole phthalate | about 60 parts by wt. |
| - basic aluminum salicylate | about 80 parts by wt. |
| - sodium glutamate | about 20 parts by wt. |
| - magnesium glutamate | about 50 parts by wt. |
| - magnesium fumarate | about 30 parts by wt. |
| - potassium fumarate | about 20 parts by wt. |

7. A process for controlling diarrhoea in young farm animals comprising administering to said animals an amount effective to control diarrhoea of the composition of claim 1.

8. A composition as claimed in claim 1, wherein the rehydrating agent is a mixture of magnesium fumarate and sodium glutamate.

9. A composition as claimed in claim 3, wherein the disinfectants consist of a mixture of bismuth 8-hydroxy quinoleate and sodium 7-iodo-8-hydroxy quinoline-5-sulphonate.

* * * * *